United States Patent
David, IV

[15] 3,675,483
[45] July 11, 1972

[54] WATER SURFACE DEPTH INSTRUMENT

[72] Inventor: Quinton C. David, IV, 1364 N. Queen Street, Hampton, Va. 23369

[22] Filed: Feb. 23, 1971

[21] Appl. No.: 117,984

[52] U.S. Cl. .......................... 73/327, 33/169 F, 116/118 R
[51] Int. Cl. ........................................................ G01f 23/02
[58] Field of Search .............. 73/327, 293, 290 B, 307, 314, 73/343 R, 327, 293, 290 B, 314; 116/118 R; 33/126.7 R, 169 F

[56] References Cited

UNITED STATES PATENTS

| | | | |
|---|---|---|---|
| 3,362,224 | 1/1968 | Melone | 73/327 |
| 2,423,888 | 7/1947 | Hueser | 33/126.7 R |
| 3,103,816 | 9/1963 | Kawecki | 73/323 X |
| 3,309,236 | 3/1967 | Gunji | 73/343 R X |
| 2,368,705 | 2/1945 | DuPont et al. | 73/327 |
| 3,186,224 | 6/1965 | Mair | 73/304 R |

FOREIGN PATENTS OR APPLICATIONS

| | | | |
|---|---|---|---|
| 1,198,474 | 7/1970 | Great Britain | 73/327 |

*Primary Examiner*—Louis R. Prince
*Assistant Examiner*—Daniel M. Yasich
*Attorney*—Howard J. Osborn and John R. Manning

[57] ABSTRACT

An instrument for measuring the depth of liquid on a planar surface having particular application to measuring the depth of water on an airport runway. The instrument can be set on the runway in depth variations of 0.01 inch and less surface and will give an immediate reading of the depth of water covering the runway.

10 Claims, 2 Drawing Figures

3,675,483

INVENTOR.
QUINTON C. DAVIS, IV
BY Howard J. Osborn
ATTORNEY

WATER SURFACE DEPTH INSTRUMENT

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

Devices exist for measuring the depth of water on a runway. One such device is of the nature whereby the instrument is placed in the water and wetted by the depth of the water. The instrument is then lifted from the runway and reading of the instrument is dependent on the adhesion of water to the instrument. Although this instrument works to a degree, and on occasion gives accurate reading, there is a tendency for the water to drop off the instrument as it is lifted giving inaccurate readings. Also, on occasion the instrument must be used under adverse weather conditions, this having a negative effect on the accuracy of the instrument.

Another type of instrument which has been utilized for measuring the depth of liquid involves the use of probes having varying lengths which project into the liquid. The probes are made of a material and designed such that a probe which is wetted reflects the light thereon causing a difference in shading between the wetted and nonwetted probe. This type of probe is somewhat similar to the invention claimed herein; however, the prior art instruments of this nature measure the depth of a liquid only in a general nature. For example, such instruments will indicate generally if a tank is three-fourths full or half full. Such instruments are not useful for measuring the depth of water on a runway surface since variations in the depth of water must be measured in increments of one-hundredths of an inch or less.

SUMMARY OF THE INVENTION

The present invention overcomes the difficulties shown in the prior art by utilizing the combined principles of light refraction and capillary action of liquids. The instrument has a series of probes which are set at various distances from the surface on which the instrument rests. However, the faces or liquid-engaging ends of the probes or indicating rods are designed such that when they are contacted by the wetting agent an immediate indication of wetting is shown on the entire upper surface of the indicating rod. This is accomplished by tapering the lower end of the rod inwardly and then forming another tapered depression into the rod. Thus, when any part of the lower end of the rod is wetted, capillary action takes place drawing the liquid into the depressed area of the rod. Light refraction takes place similar to the circumstances where a probe having a long taper is completely covered with liquid. Obviously, this takes place in the invention if the liquid is touching any point of the probe and darkens the entire upper surface providing a definite indication of the liquid depths.

DESCRIPTION OF THE PREFERRED EMBODIMENT

Figure 1:
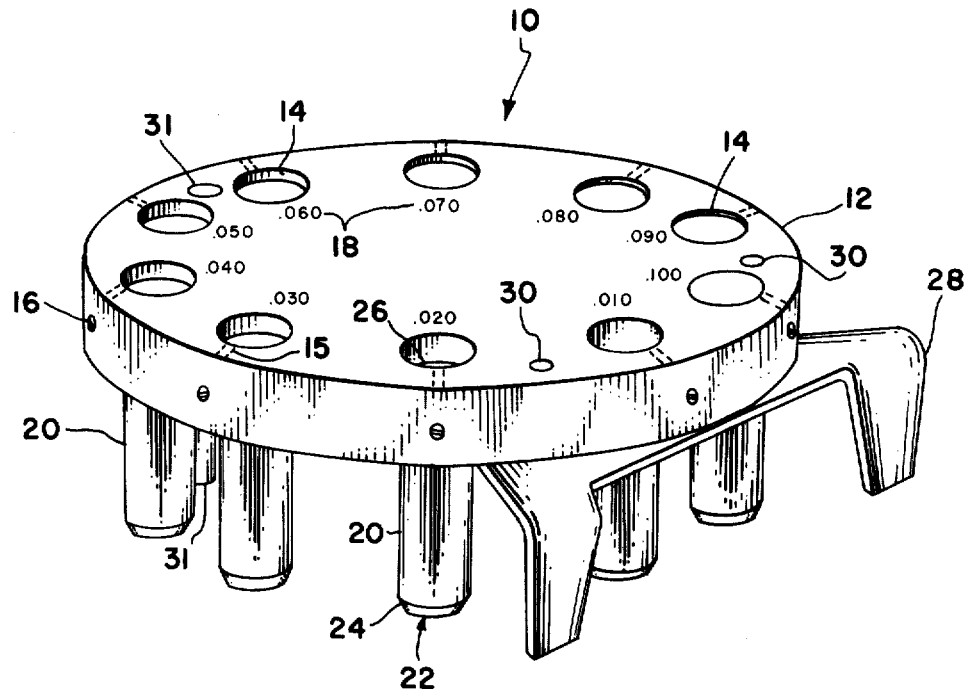
FIG. 1 is a perspective view of the liquid depth measuring instrument.
Figure 2:
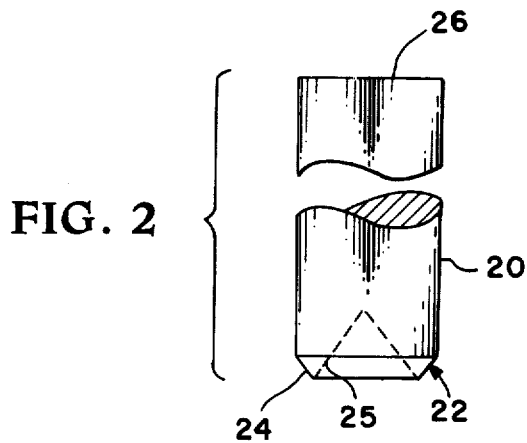
FIG. 2 is an enlarged side elevational view showing the face or lower surface of one of the indicator probes.

The overall invention is shown in FIG. 1 and designated generally by the reference numeral 10. The liquid depth indicator 10 has a body 12. The body 12 may be made of some type of lightweight material whose physical properties are not adversely affected by a liquid such as water. One such material found suitable for this purpose is plexiglas. The body is of a generally disk shape or design although it is to be understood that it might take other shapes or designs. A number of apertures 14 are formed or machined through the body at equally spaced intervals thereabout. Threaded holes 15 are constructed through the side of the body and communicate with each of the apertures. These holes receive setscrews 16 for positioning and holding probe-like indicators now to be described.

The indicators 20 are rods which are constructed from some material which will readily transmit light and are not adversely affected bY the liquid which they engage. In actual construction of the instrument, it was found that plexiglas was particularly suited for this use; the plexiglas having good light-transmitting properties and not easily breakable. The indicators 20 are all made of the same length and have a polished upper end or surface 26. The lower surface or face of the indicator has an inner directed taper 24 which in practice was of a length of approximately three thirty-seconds (2.4 mm.) of an inch and at an angle of approximately 96° with respect to the longitudinal axis of the indicator. The indicator face 22 also has a depression 25 formed therein which is of a depth of approximately three-eighths (9.6mm.) of an inch and positioned at an angle of 100° with respect to the longitudinal axis of the indicator. These dimensions and angles are somewhat critical but do not have to be exactly as stated. The indicators are made of a diameter such that they will slide through the apertures 14 formed in the indicator body 12, but with very little clearance. The setscrews 16 engage a point on the indicators and lock them in a particular position. Although it should be understood that the instrument can be used for measuring liquids of varying depths and liquid of substantial depth, the particular application of the instrument to the measurement of water on a runway resulted in setting up the instrument for measuring liquid from one one-hundredth inch (0.254mm.) to one tenth inches (2.54mm.) in depth. To accomplish this, 10 of the body apertures 14 receive 10 of the indicator probes 20. Starting at a given point, and continuing around the body of the indicator, the indicator probes are set in increments of one one-hundredths inch from the surface on which the instrument rests. Indicia 18 are carried by the body 24 and positioned adjacent the particular indicator to denote how far that particular indicator is set from the surface. As shown in FIG. 1, the indicia increases from one-hundredths inch by increments of a hundredth of an inch to one-tenth of an inch.

The indicator body 12 is designed to be of sufficient thickness such that the indicators can be retained in position by the setscrews and still arrange for the upper surfaces 26 of the indicators to be countersunk below the upper surface of the indicator body 12. This assists in seeing the darkened upper surface of the indicator when it is wetted by a liquid.

The indicator body and probes are held in position above the surface on which the instruments rests by a tripod-like leg arrangement which consists of a generally U-shaped flange 28 providing for two of the legs and a dowel or pin 31 which provides for the other leg. The legs 28 are fastened to the indicator with threaded fasteners 30 in a conventional manner. The legs 28 extend beyond the periphery of the body 12 to enable the ends of the legs to touch the surface on which the liquid is to be measured prior to any other part of the indicator. This assists in obtaining an accurate reading since if the instrument is not placed exactly level on the surface, it is possible to wet one of the probes and get a bad reading. By touching the surface first with the extended legs and then lowering the rest of the instrument, this is avoided. The leg 31 is threaded at its upper end and screws into a threaded aperture provided in the indicator body for receipt of the leg. Although a tripod-positioning arrangement has proven suitable, it is to be understood that it is within the scope of the invention to position the indicator body and probes above the surface with most any type of support structure.

OPERATION

The liquid depth indicator 10 is a highly portable instrument as should be apparent from the above description and the drawings. When it is desired to measure the depth of liquid on a surface, the instrument 10 is taken to the spot of measurement and placed on the surface which is covered by the liquid. If the liquid is of sufficient depth to contact any of the indicator probes, the ends of the probes will be wetted. When the ends of the probes are wetted, the capillary action of the liquid with the probe causes the liquid to move into the depression and wet the entire surface 25. The light traveling through the indicator probe when striking the wetted surface 25 is refracted rather than reflected and dispersed. Since the light is not reflected, the upper surface 26 of the indicator probe looks dark thereby indicating that the water is of at least this depth. This depth can be determined by reading the indicia which is adjacent to the darkened indicator probe. If several of the probes are darkened, the darkened probe adjacent the indicia indicating the greatest distance from the surface, denotes the depth of the liquid. If the probe is not wetted by the liquid, the light is reflected from the tapered depression 25, and the upper surface 26 thereof appears bright.

With the capability of the setscrews to hold the probes in various position, the probes can be set at various heights with respect to the surface on which the instrument rests. Of course, the indicia on the indicator body is changed to correspond to the distance between the end of the indicator probes and the surface being measured from.

It should be apparent from the above description that the instrument is highly portable and can be taken to the runway or other surface which is covered with water or liquid to readily measure the depth of water thereon. Also, the instrument gives an immediate reading of the depth of water as it rests in position on the particular surface which is covered with water. The instrument can be utilized at all hours of the day or night, the instrument giving a reading at night by merely directing a beam of light on the top of the instrument. The instrument is extremely accurate for various reasons one of which is that it gives an immediate indication of water depth as it rests on the surface which is covered by liquid. Additionally, the design of the indicator probes is such that the combination of the capillary action of the liquid with the refraction of light principle gives a reading as soon as the liquid touches the indicator probe. This allows for measurement of very small change in depth of liquid on a surface such as a runway. Since a change in depth of water on a runway in the order of one-one hundredth of an inch can be extremely important to the safety of aircraft landing, the quick and accurate reading which the instrument gives makes it extremely useful.

What is claimed as new and desired to be secured by Letters Patent of the United States is:

1. A liquid depth indicator instrument for indicating the depth of liquid on a surface comprising:
   an indicator body means;
   legs for supporting said body means at a height above the depth of liquid to be measured;
   a plurality of indicators carried by said body means;
   each said indicator having face means set at a specified distance from the surface;
   indicia placed on said body means adjacent said indicator indicating the distance of the indicator face means from the surface;
   said indicator face means formed by a tapered edge and adjacent depression and constructed so that when wetted by a liquid depth variation of not more than 0.01 inch darkens the entire upper end of the indicator;
   the indicator shaded adjacent the largest indicia indicating the depth of the liquid.

2. A liquid depth indicator as in claim 1 wherein the indicators are plexiglas rods.

3. A liquid depth indicator as in claim 1 wherein the indicators are adjustable with respect to the indicator body allowing differing levels of liquid to be measured.

4. A liquid depth indicator as in claim 1 wherein said tapered edge and depression on said indicators have angles of approximately 96° and 100°, respectively, with respect to the longitudinal axis of the indicators.

5. A liquid depth indicator as in claim 1 wherein said indicators are all the same length, and means for setting the indicators at varying distances from the surface to measure different depths of liquid.

6. A liquid depth indicator as in claim 1 wherein the upper surface and the faces are polished.

7. A liquid depth indicator as in claim 1 wherein the indicators vary in distance from the surface on which the instrument rests in increments of 0.010 inch; the indicia varying in like increments.

8. A liquid depth indicator as in claim 1 wherein the indicator body means is of sufficient thickness to enable the indicators of equal length to be set at varying distances from the surface on which the instruments rest throughout the range of measurements to be made and still maintain the upper surface of the indicators below the upper surface of the bodY means to facilitate reading the instrument when the indicators are wetted.

9. A liquid depth indicator as in claim 1 wherein said indicator body means has leg means for supporting said indicator above a surface; certain of said leg means extending beyond the confines of said body means such that the leg means of the indicator may touch the surface on which the indicator will be placed for measurement prior to any other element of the instrument.

10. A liquid depth indicator as in claim 1 wherein the upper ends of the indicators are flat.

* * * * *

UNITED STATES PATENT OFFICE
CERTIFICATE OF CORRECTION

Patent No. 3,675,483           Dated July 11, 1972

Inventor(s)    Quinton C. Davis, IV

It is certified that error appears in the above-identified patent and that said Letters Patent are hereby corrected as shown below:

On the cover sheet [72] the inventor's name "Quinton C. David, IV" should appear -- Quinton C. Davis, IV --.

Signed and sealed this 19th day of December 1972.

(SEAL)
Attest:

EDWARD M. FLETCHER, JR.                    ROBERT GOTTSCHALK
Attesting Officer                          Commissioner of Patents